United States Patent [19]

Miyawaki

[11] Patent Number: 4,680,991
[45] Date of Patent: Jul. 21, 1987

[54] SYSTEM FOR CONTROLLING THE TRANSMISSION RATIO IN AN INFINITELY VARIABLE TRANSMISSION

[75] Inventor: Motohisa Miyawaki, Chofu, Japan

[73] Assignee: Fuji Jukogyo Kabushiki Kaisha, Tokyo, Japan

[21] Appl. No.: 693,706

[22] Filed: Jan. 23, 1985

[30] Foreign Application Priority Data

Jan. 30, 1984 [JP] Japan ................................ 59-14741

[51] Int. Cl.⁴ ............................................ B60K 41/16
[52] U.S. Cl. ...................................... 74/868; 74/689; 474/28
[58] Field of Search ................ 74/865, 867, 868, 689; 474/18, 28

[56] References Cited

U.S. PATENT DOCUMENTS

| | | | |
|---|---|---|---|
| 3,893,344 | 7/1975 | Dantlgraber et al. | 474/28 X |
| 4,094,203 | 6/1978 | van Deursen et al. | 474/28 |
| 4,161,894 | 7/1979 | Giacosa | 474/28 X |
| 4,369,675 | 1/1983 | van Deursen | 74/864 |
| 4,400,164 | 8/1983 | Cadee | 474/28 X |
| 4,467,674 | 8/1984 | van Deursen et al. | 74/867 |
| 4,478,105 | 10/1984 | Yamamuro et al. | 74/689 X |
| 4,515,041 | 5/1985 | Frank et al. | 74/857 X |
| 4,542,665 | 9/1985 | Yamamuro et al. | 74/867 X |

FOREIGN PATENT DOCUMENTS

| | | | |
|---|---|---|---|
| 51918 | 9/1981 | European Pat. Off. | 474/28 |
| 2129073 | 5/1984 | United Kingdom | 474/28 |

Primary Examiner—Lawrence Staab
Assistant Examiner—Dwight G. Diehl
Attorney, Agent, or Firm—Martin A. Farber

[57] ABSTRACT

A system for an infinitely variable belt-drive transmission for an engine comprises a primary pulley having a hydraulically shiftable disc, a secondary pulley having a hydraulically shiftable disc, a belt engaged with both pulleys, and a hydraulic circuit. A transmission ratio control valve having a spool is provided to be responsive to engine speed for controlling the oil and for shifting the disc of the primary pulley to change the transmission ratio. Pitot pressure dependent on the engine speed is applied to the spool to shift it against a spring, the force of which is determined by the depression of an accelerator pedal. An actuator is proviced to increase the load on the spring to downshift the transmission. A manual select device is provided to opeate the actuator for downshifting.

8 Claims, 7 Drawing Figures

SYSTEM FOR CONTROLLING THE TRANSMISSION RATIO IN AN INFINITELY VARIABLE TRANSMISSION

BACKGROUND OF THE INVENTION

The present invention relates to a transmission control system of an infinitely variable belt-drive automatic transmission for a vehicle, and particularly to a system which provides engine braking in the most proper mode at any vehicle speed when an active drive range is selected.

U.S. Pat. No. 4,369,675 discloses a control system for an infinitely variable belt-drive transmission providing an active drive mode. According to the conventional art, the transmission ratio is controlled in accordance with the depression of an accelerator pedal of a vehicle and with the engine speed which is represented by pitot pressure. The relationship between the engine speed and vehicle speed in accordance with the transmission is shown in FIG. 5, in which a line "l" represents the variation dependent on the largest transmission ratio, and $M_1$ shows a transmission ratio varying line at the highest engine speed. When engine speed decreases, the engine speed and vehicle speed decrease along the smallest transmission ratio line "h" and the vehicle speed only decreases along a line $M_2$ of the lowest engine speed. Such a transmission ratio variation pattern does not provide a large engine braking effect on the vehicle, which means an inactive drive mode.

In order to enable the transmission to operate so as to provide an active drive mode, an improvement is proposed, having a device for operating a transmission ratio control valve. In accordance with the improved system, when the active drive mode is selected at a point Ds in FIG. 5, engine speed rises to a line $M_3$, which means an increase of the transmission ratio. Thus, the vehicle speed decreases along the line $M_3$ with an increase of the transmission ratio, providing a high engine braking effect.

However, in such a system, the line $M_3$ is set at to a certain level irrespective of the variation of vehicle speed. Accordingly, if the level is set at a high engine speed so as to provide a sufficient engine braking effect in a high vehicle speed range, extremely high engine braking acts on the vehicle at a low vehicle speed, causing unpleasant and unsmooth driving of the vehicle.

SUMMARY OF THE INVENTION

The object of the present invention is to provide a system which may control an infinitely variable transmission to provide a moderate engine braking effect in a wide range of vehicle speed.

According to the present invention, there is provided a control system for an infinitely variable transmission for a vehicle powered by an internal combustion engine, the transmission comprising a drive pulley having a hydraulically shiftable disc and a hydraulic cylinder for shifting the disc, a driven pulley having a hydraulically shiftable disc and a hydraulic cylinder for operating the disc, a belt engaged with both pulleys, a hydraulic circuit having a pump for supplying oil, a detecting means for producing a first signal dependent on engine speed, a transmission ratio control valve having a first spool responsive to the first signal for controlling the oil and for shifting the disc of the drive pulley to change the transmission ratio, and a pressure regulator valve having a spool responsive to the transmission ratio for increasing the line pressure of the hydraulic circuit with increase of the transmission ratio. The system further comprises a plunger coaxial with the spool of the transmission ratio control valve and axially movably provided, a spring provided between the first spool and the plunger, first means for shifting the correcting member in dependency on the depression of an accelerator pedal of the vehicle, thereby shifting the first spool against the force dependent on the first signal, an actuator responsive to the line pressure for shifting the plunger against the force dependent on the first signal, second means responsive to the movement of the disc of the drive pulley from a predetermined transmission ratio in the transmission ratio increasing direction for disabling the actuator and for decreasing the load on the spring; and manual selecting means for applying the line pressure to the actuator for operating it, whereby when the actuator operates, the first spool is shifted at a higher engine speed, so that the transmission ratio begins to increase and the load on the spring is reduced after the predetermined transmission ratio by the operation of the second means.

In an aspect of the present invention, the first means comprises a cam operatively connected to the accelerator pedal and a rod following the rotation of the cam to shift the plunger, the detecting means is a pitot tube for producing the pitot pressure, and the actuator comprises a hydraulic cylinder and a piston provided in the cylinder.

DETAILED DESCRIPTION OF THE PREFERRED EMBODIMENT

Figure 1A:
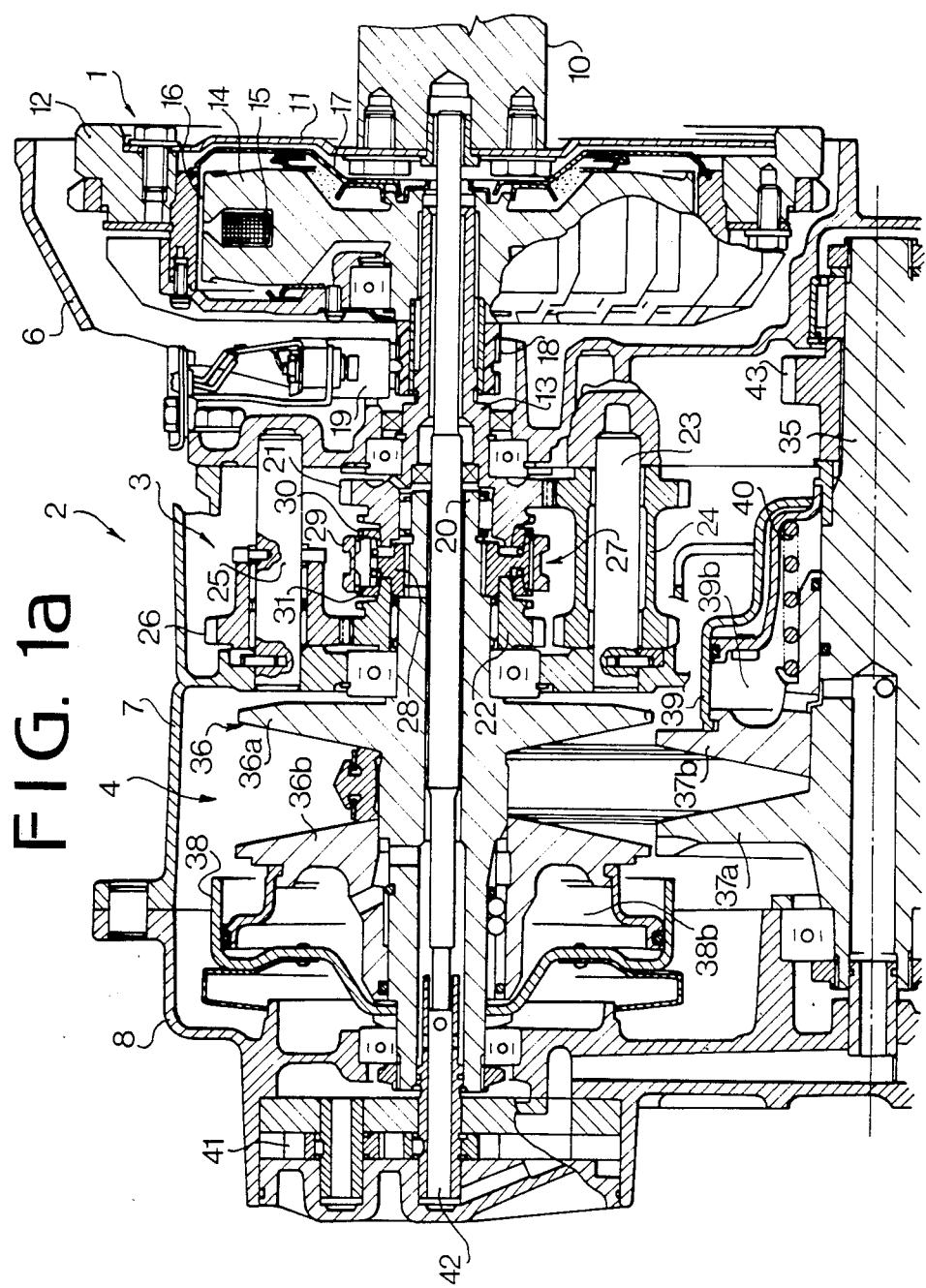
FIGS. 1a and 1b are cross sectional views showing an infinitely variable belt-drive transmission to which the present invention is applied.
Figure 1B:
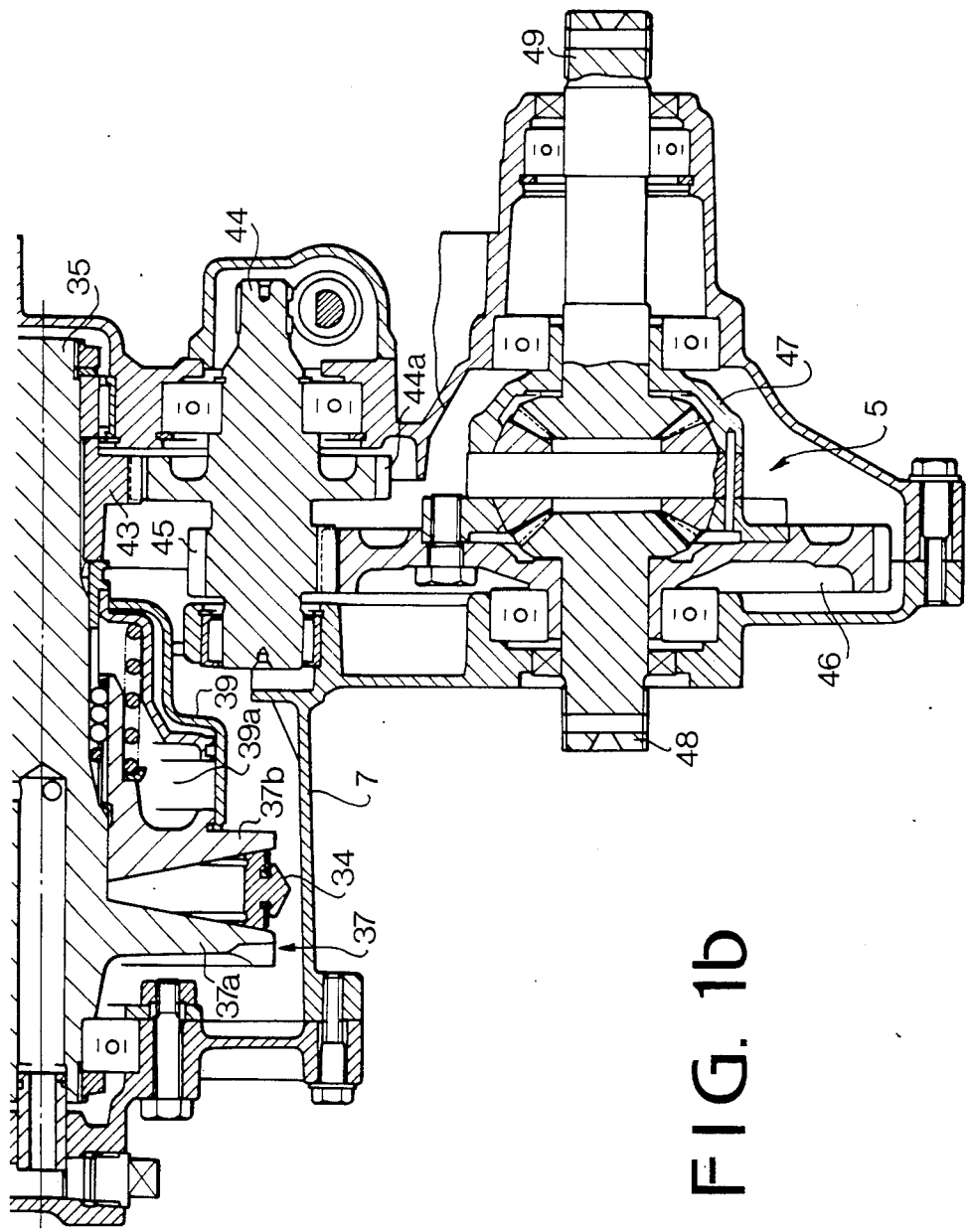

Referring to FIGS. 1a and 1b, an infinitely variable belt-drive automatic transmission for a vehicle, to which the present invention is applied, comprises an electromagnetic powder clutch 1, an infinitely variable belt-drive transmission 2, including a selector device 3, pulleys and belt device 4, and a final reduction device 5, and a pressure oil control circuit (not shown). The electromagnetic powder clutch 1 is provided in a housing 6, and the selector device 3, pulleys and belt device 4 and final reduction device 5 are provided in a main housing 7 and a side housing 8. A crankshaft 10 of an engine (not shown) is connected to an annular drive member 12 through a drive plate 11 of the electromagnetic powder clutch 1. The electromagnetic powder clutch comprises a driven member 14, and a magnetizing coil 15 provided in the driven member 14. The driven member 14 has its outer periphery spaced from the inner periphery of the drive member 12 by a gap 16, and a powder chamber 17 is defined between the drive member 12 and driven member 14. Magnetic powder is provided in the powder chamber 17. The driven member 14 is secured to an input shaft 13 of the belt-drive transmission. A holder secured to the driven member 14 carries slip rings 18 which are electrically connected to the coil 15. The coil 15 is supplied through brushes 19 and slip rings 18 with current from a control circuit for the electromagnetic powder clutch.

When the magnetizing coil 15 is excited by the clutch current, driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the belt-drive transmission 2, the selector device 3 is provided between the input shaft 13 and a main shaft 20. The main shaft 20 is cylindrical and is disposed coaxially with the input shaft 13. The selector device 3 comprises a drive gear 21 integral with the input shaft 13, reverse driven gear 22 rotatably mounted on the main shaft 20, and a synchronizer 27 mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22. (The idle gear 26 is illustrated in development in FIG. 1a for the convenience of the illustration).

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of driven gear 22 through rings 30 or 31.

At a neutral position (N range) of a selector lever 110 (FIG. 2 b), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a driving position (D range).

When the sleeve 29 is engaged with the gear 22, the input shaft 13 is connected to the main shaft 20 through gears 21, 24, 26 and 22 to provide a reverse driving position (R range).

The main shaft 20 has an axial passage in which an oil pump driving shaft 42 connected to crankshaft 10 is mounted. An output shaft 35 is provided in parallel with the main shaft 20. A drive pulley 36 and a driven pulley 37 are mounted on shafts 20 and 35. A fixed conical disc 36a of the drive pulley 36 is integral with main shaft 20 and an axially movable conical disc 36b is axially slidably mounted on the main shaft 20. The movable conical disc 36b also slides in a cylinder secured to the main shaft 20 to form a servo device 38. A chamber of the servo device 38 communicates with an oil pump 41 through the pressure oil control circuit. The oil pump 41 is driven by the shaft 42.

A fixed conical disc 37a of the driven pulley 37 is formed on the output shaft 35 opposite the movable disc 36b and a movable conical disc 37b is slidably mounted on the shaft 35 opposite disc 36a. Movable conical disc 37b has a cylindrical portion in which a piston portion of the output shaft 35 is slidably engaged to form a servo device 39. A chamber of the servo device 39 is communicated with the oil pump 41 through the pressure oil control circuit. A spring 40 is provided to press the movable conical disc 37b toward the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46 of the final reduction device 5. Rotation of the final gear 46 is transmitted to axles 48 and 49 of the vehicle driving wheels through a differential 47.

The pressure oil control circuit is responsive to vehicle speed, engine speed and throttle valve position for controlling the oil from the oil pump 41 to servo devices 38 and 39 thereby to move discs 36b and 37b. Thus, the transmission ratio is infinitely changed.

Figure 2A:
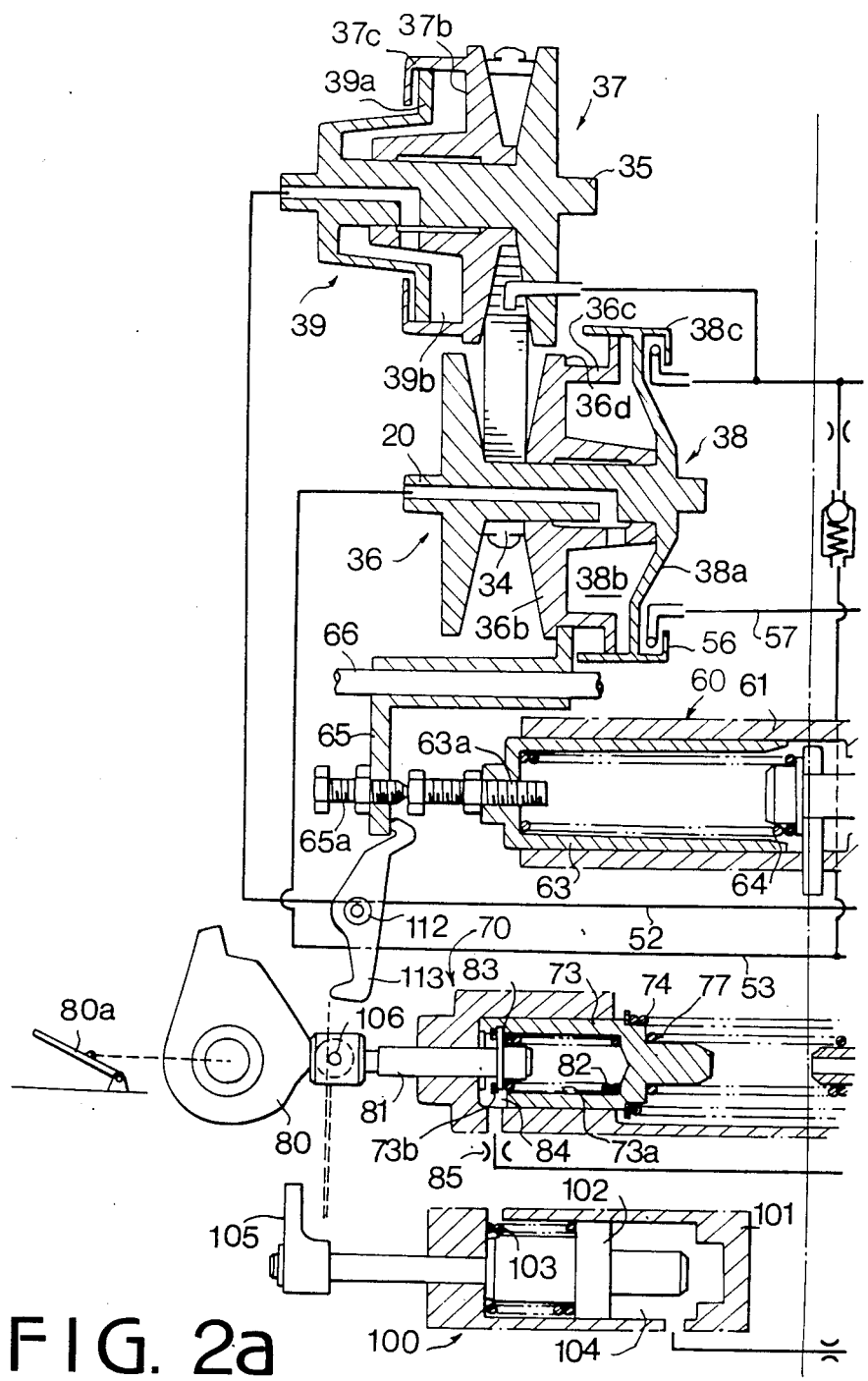
FIGS. 2a and 2b are schematic diagrams showing a control system of the transmission.
Figure 2B:
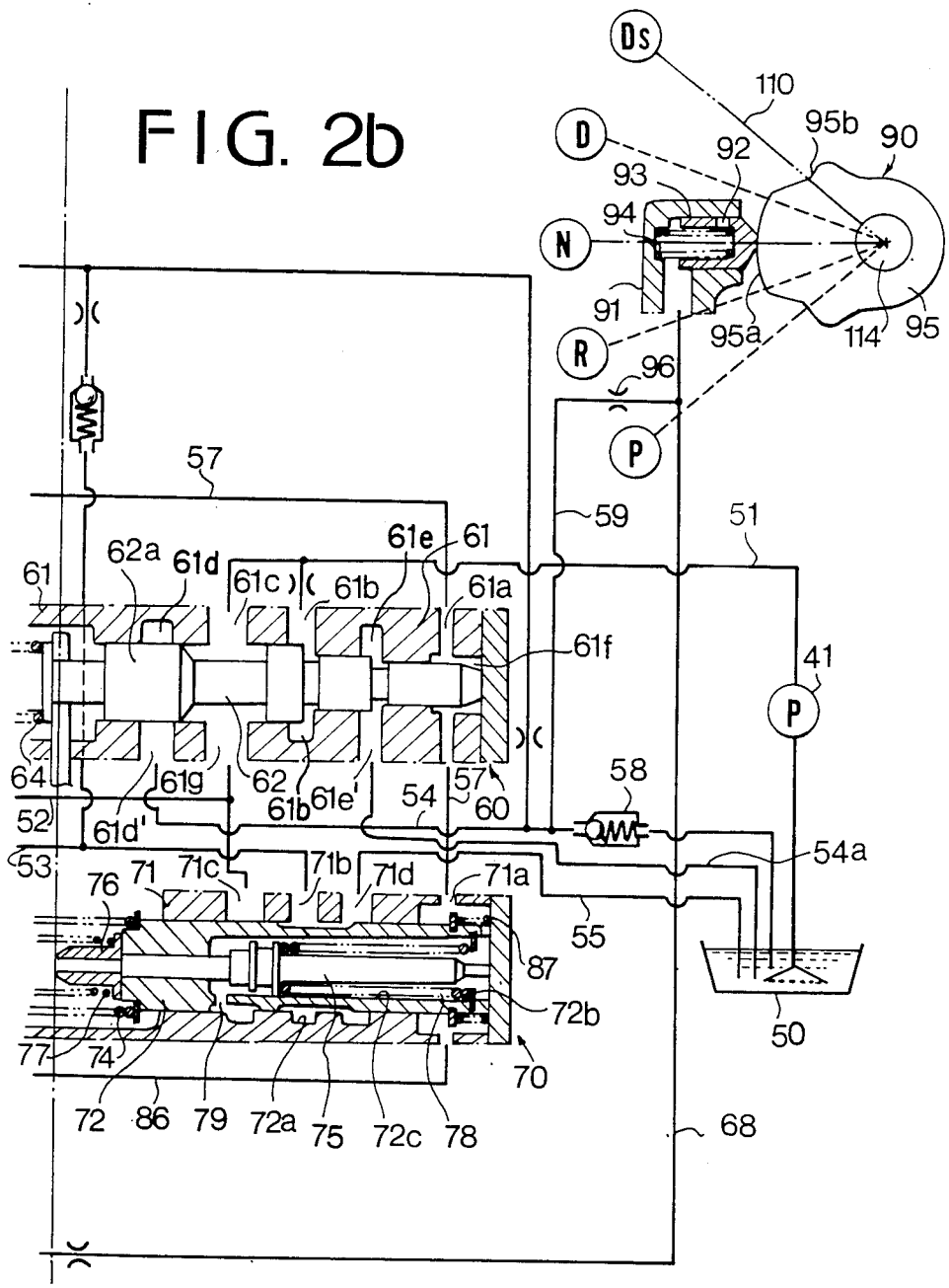

FIGS. 2a and 2b show a hydraulic control circuit. In the servo device 38 of the drive pulley 36, a cylinder 38a integrately formed on the main shaft 20 is engaged with a piston 36c formed on the movable disc 36b, forming a drive pulley servo chamber 38b, into which line pressure is applied. Also, in the other servo device 39 in the driven pulley 37, a cylinder 37c formed integrally with the movable conical disc 37b is engaged with a piston 39a formed on the output shaft 35, forming a driven pulley servo chamber 39b. The movable disc 36b has an area exposed to the line pressure which is larger than the corresponding area of the movable disc 37b. Oil in an oil reservoir 50 is supplied to a pressure regulator valve 60 through a passage 51 by the pump 41. An oil passage 52 from the pressure regulator valve 60 is communicated with the driven pulley servo chamber 39b and also with the drive pulley servo chamber 38b through a transmission ratio control valve 70 and a passage 53. Oil flows back to the oil reservoir 50 through drain passages 54 and 55 which are in communication with the valves 60 and 70, respectively. The main pulley cylinder 38a has an annular inside groove 38c in which a rotation speed sensor 56 in the form of a pitot tube is provided for measuring the speed of the oil in the groove, that is the speed of the main shaft 20 which varies dependent on the engine speed. The pitot pressure produced by the rotation speed sensor 56 as a pitot tube is applied to the valves 60 and 70 through a passage 57.

A ball check valve 58 is provided in the drain passage 54 for the pressure regulator valve 60, and the passage is communicated with a select position detecting valve 90 upstream of the check valve 58 through a passage 59 and further with an actuator 100 for the transmission ratio control valve 70 through a passage 68.

The pressure regulator valve 60 comprises a valve body 61, a spool 62, a spring 64 provided between a spring retainer 63 and one end of the spool 62 for biasing the spool 62 to the right. A sensor shoe 65 for detecting the actual transmission ratio is slidably mounted on a lubricating oil pipe 66 which is parallel with the axis of the spool 62. A bolt 65a secured to an end of the sensor shoe 65 engages with an end of a bolt 63a secured to the spring retainer 63, and the other end of the sensor shoe 65 engages with an outside periphery 36d of the movable disc 36b. Thus, the position of the movable disc 36b which represents the transmission ratio during the operation is transmitted to the spool 62 through the spring 64. At the end of the valve body 61, opposite to the spring 64, pitot pressure is applied to an end chamber 61f through the oil passage 57 and a port 61a, and pump oil pressure is applied to a chamber 61b through the passage 51. The passage 51 is communicated with the passage 52 through a ports 61c and 61g. A chamber 61d and a chamber 61e, then latter which is provided between the chambers 61f and 61b for preventing leakage of the oil from affecting on the pitot pressure, are communicated with the oil reservoir 50 through drain passages 54 and 54a via ports 61d' and 61e' respectively. The chamber 61d is communicated with the port 61g by shifting of land 62a of the spool 62 so that the line pressure can be regulated.

Thus, the spool 62 is applied with the pitot pressure and pump oil pressure so as to be moved in the direction to open the chamber 61d, whereas the elastic force of the spring corresponding to the transmission ratio detected by the sensor shoe 65 biases the spool 62 in the direction to close the port 61d. Accordingly, high line pressure is generated at the port 61c at a low engine speed with a large transmission ratio. The sensor shoe 65 is moved to the left in FIG. 2a as the transmission ratio decreases, reducing the force of the spring 64 to lower the line pressure. The line pressure acts on the belt 34 at a proper force dependent on the transmission ratio so as not to cause the belt to slip on the pulleys.

The transmission ratio control valve 70 comprises a valve body 71, a spool 72, an operating plunger 73, and a spring 74 provided between the spool 72 and the plunger 73. A chamber 71a is communicated with the passage 57 so as to be applied with the pitot pressure. The control valve 70 further comprises a port 71b communicated with passage 53, a port 71c communicated with the passage 52, a port 71d communicated with the passage 55, an annular groove 72a formed on the spool 72 so as to communicate the ports 71b and 71c or 71b and 71d for supplying or discharging line pressure to or from the drive pulley servo chamber 38b in dependency on the position of the spool 72. A regulator spring 77 is provided between the operating plunger 73 and a retainer 76 securely mounted on a projecting end of a regulator plunger 75 which is slidably provided in an axial cavity 72c in the spool 72. A spring 78 is provided between a flange of the plunger 75 and a retainer 72b of the spool 72. The force of the regulator spring 77 is determined by the projecting extent of the plunger 75 from the spool 72 and the position of the plunger 75 is dependent on the line pressure at the port 71c which is supplied to the inside of the spool 72 through a small aperture 79.

The plunger 73 is slidably mounted in the valve body 71 and has an axial cavity 73a. A rod 81 is axially slidably mounted in the valve body 71, and a flange 83 of the rod 81 is slidably engaged with the wall of the cavity 73a. A small spring 82 is provided between the flange 83 and the plunger 73, and the flange 83 engages with a stopper 73b secured to the plunger. The cavity 73a is applied with the pitot pressure through a port 84 and a passage 86 having an orifice 85 and the chamber 71a. A spring 87 is provided between an end of the spool 72 and the valve body 71 to adjust the load on the spring 82. An end of the rod 81 engages with a cam 80 which is operatively connected to an accelerator pedal 80a of the vehicle so as to be rotated in dependency on the depression of the pedal.

When the spool 72 is moved by the pitot pressure to communicate the port 71b with port 71c, the line pressure is applied to the servo chamber 38b of the drive pulley 36 to upshift the transmission. On the other hand, when the port 71b communicates with the port 71d, the chamber 38b is drained to downshift.

The selecting position detecting valve 90 comprises a valve body 91, a valve 93 having a drain aperture 92 which is slidably mounted in the valve body 91, a spring 94 for pressing the valve 93 against a cam 95 which rotates according to the position of a selector lever 110. The cam 95 has a lobe 95a which corresponds to D, N, R range positions, and indentations 95b formed in the both sides of the lobe 95a, corresponding to P, Ds range positions. At the D, N, R range positions, the lobe 95 pushes the valve 93 in the direction to close the drain aperture 92, so that actuating oil pressure is built up. At the P, Ds range positions, the valve 93 moves outwards to open the drain aperture 92, so that the lubricating oil pressure in the passages 54, 59 is lowered. At that time the oil pressure decreases gradually, because of an orifice 96 provided in the oil passage 59.

The actuator 100 comprises a cylinder 101, a piston 102 which is slidably mounted in the cylinder 101, and a spring 103 for pressing the piston 102 in a direction toward a piston chamber 104 to which actuating oil pressure is applied through the passage 68. Further, a hook 105 formed at the outer end of the piston is engageable with a pin 106 on the rod 81 of the transmission ratio control valve 70. At the P range or Ds range, since no actuating oil pressure exists, piston 102 presses the rod 81 to the right in FIG. 2a, controlling the transmission zone to the side of high engine revolution. Thus, the releasing of the acceleration pedal at Ds range causes the downshift of the transmission, so that the engine braking occurs.

Further, a correction lever 113 rotatably supported by a pin 112 is provided between the sensor shoe 65 and the hook 105 of the piston 102, in order to correct the characteristics in the Ds range.

One end of the lever 113 engages with the piston hook 105 only when piston 102 of the actuator 100 moves to the right.

Figure 3:
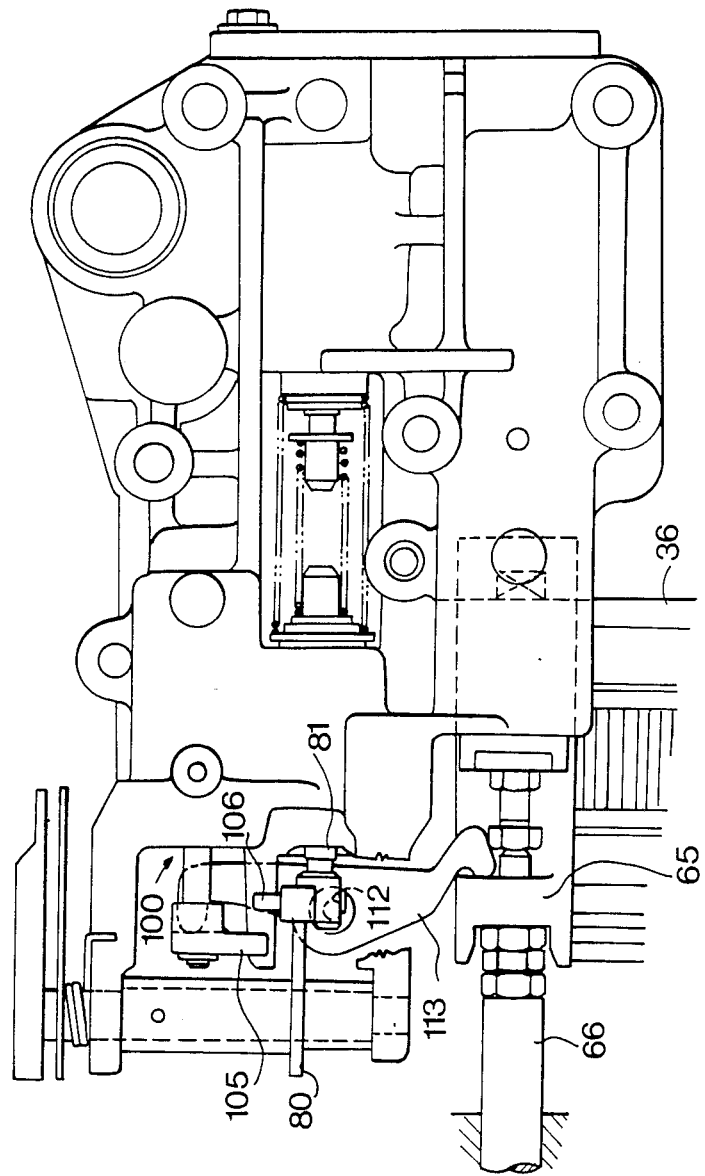
FIG. 3 is a plan view showing a part of the system.

Although the relative position of the correction lever 113 is not clear in FIG. 2a since the valves 60, 70 and the actuator 100 are shown to be separated from each other, FIG. 3 shows the actual position.

In operation, while the vehicle is at a stop, the secondary pulley servo chamber 39b is supplied with the line pressure adjusted by the pressure regulator valve 60 through the passages 51, 52, and the drive pulley servo chamber 38b is drained, since the spool 72 is at the right end position by the spring 74. Thus, in the pulley and belt device 4 of the infinitely variable belt-drive transmission 2, the driving belt 34 engages with the driven pulley 37 at a maximum running diameter to provide the largest transmission ratio (low speed stage). When D range is selected, the output shaft 35 and the main shaft 20 are connected to each other in the selector device 3 by the selector lever. When the acceleration pedal is depressed, the electromagnetic powder clutch 1 is excited by a clutch current, transmitting the engine power to the drive pulley 36. The power of the engine is transmitted to the output shaft 35 at the largest transmission ratio by the driving belt 34 and driven pulley 37, and further transmitted to axles of the driving wheels through the final reduction device 5. Thus, the vehicle is started.

At that time, the line pressure is at the highest value by the pressure regulator valve 60. The pitot pressure by the speed sensor 56 increases with increase of the engine speed. On the other hand, since the line pressure is at a high value, the plunger 75 is at the retracted position, so that the load on spring 77 is zero. The cam 80 pushes the rod 81 in dependency on the depression of the accelerator pedal, which causes the plunger 73 to be moved to the right through spring 82. The movement of the plunger 73 causes the spool 72 to be moved to the right through spring 74. When the force dependent on the pitot pressure becomes higher than the force of the spring 74, the spool 72 is moved to the left to communicate the port 71b with port 71c, so that the line pressure is applied to the chamber 38b to move the disc 36b. Thus, the transmission ratio begins to change to small value. The transmission ratio varies from a point between points $P_1$ and $P_2$ on the largest transmission ratio line 1 in FIG. 4, in dependency on driving conditions of the vehicle.

The point $P_1$ is a variation start point at the smallest depression of the accelerator pedal, and the point $P_2$ is a start point at the largest depression.

Since the line pressure is supplied to the chamber 38b, the distance between the conical discs of the drive pulley 36 is gradually decreased, so that the running diameter of driving belt 34 on the drive pulley 36 increases gradually to reduce the transmission ratio. When the disc 36b moves to the left (FIG. 2a), the sensor shoe 65, spring retainer 63 and spool 62 are also moved to the left. Accordingly, port 61g communicates with port 61d' to discharge the oil to the oil reservoir 50. Thus, the line pressure decreases, which causes the plunger 75 to move to the left, increasing the load on the spring 77. Accordingly, in order to upshift, the pitot pressure must become higher than the increment of the load on the spring 77. For example, at the largest depression of the accelerator pedal, the engine speed is increased as the transmission ratio decreases as shown by a transmission ratio varying line $m_2$ of FIG. 4. The line $m_2$ reaches a point $P_3$ on the smallest transmission ratio line h at a maximum vehicle speed.

Figure 4:
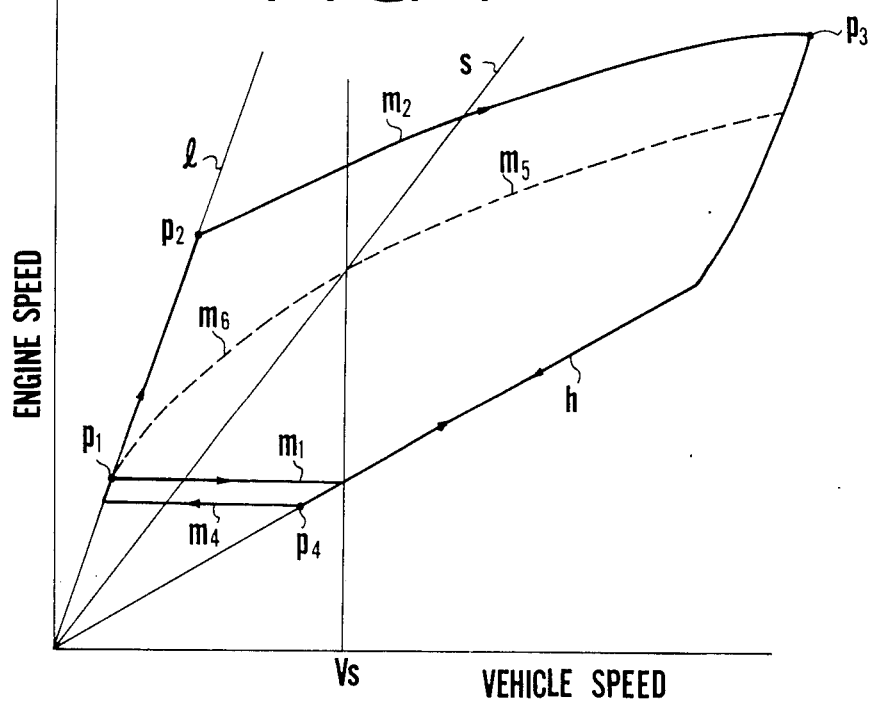
FIG. 4 is a graph showing transmission characteristics of the system according to the present invention.
Figure 5:
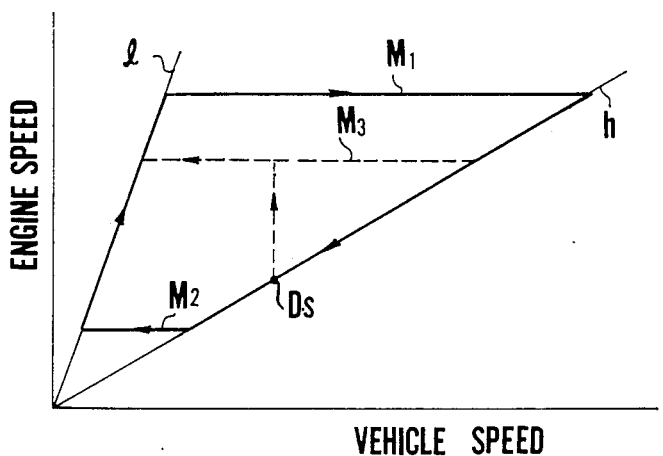
FIG. 5 is a graph showing transmission characteristics of a conventional control system.

On the other hand, when the vehicle is started at very light load such as on a downhill, before the load on the spring 77 by the cam 80 is increased, the pitot pressure rises, so that the spool 72 of the control valve 70 is shifted early. Thus, the transmission ratio begins to upshift at a low point $P_1$ and varies along line $m_1$ as shown in FIG. 4, without increasing the engine speed.

When the accelerator pedal is released, i.e. at deceleration, the operating plunger 73 in the transmission control valve 70 moves to the most retracted position, and hence the load on the spring 74 becomes minimum, so that the spool 72 is shifted to the left by the pitot pressure, in which the line pressure is applied to the drive pulley servo chamber 38b to keep the transmission ratio minimum. Thus, engine speed reduces along the line h of the minimum transmission ratio together with vehicle speed. When the engine speed decreases to a low value, the pitot pressure decreases, so that the spring 74 acts to shift the spool 72 to the right. Thus, the drive pulley servo chamber 38b is drained, so that transmission is downshifted from a point $P_4$ along a line $m_4$, keeping the engine speed constant.

Following is the explanation of the transmission control operation in the Ds range. In FIG. 4, a line S represents a predetermined transmission ratio line. When engine speed and vehicle speed reach the line S, the end of the sensor shoe 65 causes the correction lever 113 to engage with the hook 105 at the other end thereof. If the transmission ratio becomes larger than the value of the line S, the disc 36b moves to the right, so that the correction lever 113 is rotated in the clockwise direction through the sensor shoe 65, causing the piston 102 to move to the left.

When the Ds range is selected, the drain aperture 92 of the valve 90 opens thereby draining the chamber 104 of the cylinder 101. If the Ds selection is done in the region on the right side of the line S (smaller transmission ratio region), the correction lever 113 does not engage with the hook 105. Accordingly, the piston 102 is moved to the right by the spring 103, causing the hook 105 engage with the pin 106 on the rod 81 to move the rod to the right. Thus, plunger 73 is shifted to the right to increase the load on springs 74 and 77. Accordingly, the spool 72 is shifted to the right at a high engine speed (at a high pitot pressure), so that the transmission ratio increases as shown by line $m_5$ in a high engine speed range.

On the other hand, when Ds range is selected in the range of the left side of the line S, or after the Ds range selection, engine speed or vehicle speed enters into the left side range, the transmission ratio becomes larger than the ratio S. Accordingly, the end of the sensor shoe 65 operatively engages the hook 105 through lever 113 to shift the piston 102 to the left, so that the load on the springs 74, 77 of the transmission ratio valve 70 is reduced gradually. Thus, the transmission ratio line is corrected as shown by a line $m_6$ in FIG. 4. The engine speed decreases as the transmission ratio becomes larger, since the load on the springs 74, 77 decreases gradually.

Consequently, in the vehicle speed range higher than the vehicle speed Vs at which the line $m_5$ changes to $m_6$, sufficient engine braking is effected, since the transmission ratio is downshifted from the line h to line $m_5$. In the range lower than the vehicle speed Vs, moderate engine braking is produced, since the transmission is downshifted to the line $m_6$ effective at low engine speed.

The correction range and the characteristics of the Ds range can be changed, for example by changing the pivot point of the correction lever 113. Further, because the line pressure adjusted by the pressure regulator valve 60 varies according to the transmission ratio, the line pressure can also be used for actuating an additionally provided valve to release the actuator 100.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for an infinitely variable transmission for a vehicle powered by an internal combustion engine, the transmission comprising a drive pulley having a hydraulically shiftable disc and a first hydraulic cylinder for shifting the disc, a driven pulley having a hydraulically shiftable disc and a second hydraulic cylinder for operating the disc of the driven pulley, and a belt engaged with both pulleys, the transmission defining a transmission ratio, a hydraulic circuit having a pump for supplying oil, a detecting means for producing a first signal dependent on engine speed, a transmission ratio control valve having a shiftable first spool responsive to the first signal for controlling the oil and for shifting the disc of the drive pulley to change the transmission ratio, and a pressure regulator valve having a second spool responsive to the transmission ratio for increasing line pressure of the hydraulic circuit with an increase of the transmission ratio, wherein the improvement comprises:
- a plunger coaxial with the spool of the transmission ratio control valve and axially movable provided;
- a spring provided between the first spool and the plunger;
- first means for shifting the plunger in dependency on depression of an accelerator pedal of the vehicle, thereby via said spring shifting the first spool in opposition to the force dependent on the first signal;
- said manual selecting means for applying the line pressure to the actuator for releasing the actuator from the plunger;
- an actuator for shifting the plunger against the force dependent on the first signal;
- manual selecting means for operating the actuator for shifting the plunger against the force dependent on the first signal;
- second means responsive to the movement of the disc of the drive pulley from a predetermined transmission ratio in a transmission ratio increasing direction for disabling the actuator; and
- said manual selecting means for operating the actuator, whereby when the actuator operates, the first spool is shifted at a predetermined engine speed, so that the transmission ratio begins to increase and the load on the spring is reduced after the predetermined transmission ratio by the operation of the second means.

2. The control system according to claim 1 wherein said first means comprises a cam operatively connected to the accelerator pedal and rod means following the rotation of the cam for shifting the plunger.

3. The control system according to claim 2 further comprising
- a spring provided between the rod means and the plunger.

4. The control system according to claim 1 wherein the detecting means is a pitot tube for producing pitot pressure.

5. The control system according to claim 1 wherein the actuator comprises a third hydraulic cylinder and
- a piston provided in the third hydraulic cylinder, and
- the manual selecting means includes valve means for controlling the line pressure applied to the third hydraulic cylinder.

6. The control system according to claim 5, wherein the manual selecting means comprises a selector lever, and a cam operated by the selector lever to operate the valve means.

7. The control system according to claim 1 wherein said second means comprises a sensor shoe engaged with the disc of the drive pulley and adapted to disable the actuator.

8. In a control system for an infinitely variable transmission for a vehicle powered by an internal combustion engine, the transmission comprising a drive pulley having a hydraulically shiftable disc and a first hydraulic cylinder for shifting the disc, a driven pulley having a hydraulically shiftable disc and a second hydraulic cylinder for operating the disc of the driven pulley, and a belt engaged with both pulleys, the transmission defining a transmission ratio, a hydraulic circuit having a pump for supplying oil, a detecting means for producing a first signal dependent on engine speed, a transmission ratio control valve having a shiftable first spool responsive to the first signal for controlling the oil and for shifting the disc of the drive pulley to change the transmission ratio, and a pressure regulator valve having a second spool responsive to the transmission ratio for increasing line pressure of the hydraulic circuit with an increase of the transmission ratio, wherein the improvement comprises:
- a plunger coaxial with the spool of the transmission ratio control valve and axially movably provided;
- a spring provided between the first spool and the plunger;
- first means for shifting the plunger in dependency on depression of an accelerator pedal of the vehicle, thereby via said spring shifting the first spool in opposition to the force dependent on the first signal;
- an actuator for shifting the plunger against the force dependent on the first signal;
- manual selecting means for operating the actuator for shifting the plunger against the force dependent on the first signal and for applying the line pressure to the actuator for releasing the actuator from the plunger, respectively; and
- second means responsive to the movement of the disc of the drive pulley from a predetermined transmission ratio in a transmission ratio increasing direction for disabling the actuator.

* * * * *